United States Patent [19]

Cigliano

[11] 4,113,227

[45] Sep. 12, 1978

[54] CAM LOCK WITH VERTICAL PLUNGER

[75] Inventor: Irving Louis Cigliano, Oceanside, N.Y.

[73] Assignee: Marine Moisture Control Co., Inc., Long Island, N.Y.

[21] Appl. No.: 784,702

[22] Filed: Apr. 5, 1977

[51] Int. Cl.² ............................................. F16L 23/02
[52] U.S. Cl. ...................................... 151/54; 285/84; 403/316; 151/8; 248/507
[58] Field of Search ....................... 151/6, 8, 9, 10, 13, 151/48, 47, 50, 63, 64, 67, 24, 54; 248/507, 508; 285/39, 84, 85, 86, 308, 317, 358, 394; 403/316, 317, 318, 336, 338; 81/177 B

[56] References Cited

U.S. PATENT DOCUMENTS

| 761,388 | 5/1904 | Morris | 151/8 |
| 898,017 | 9/1908 | Steen | 285/84 |
| 2,996,318 | 8/1961 | Gravert | 285/358 |
| 3,581,609 | 6/1971 | Greenwood | 151/8 |

FOREIGN PATENT DOCUMENTS 564,203 11/1932 Fed. Rep. of Germany ........... 285/358

*Primary Examiner*—Marion Parsons, Jr.
*Attorney, Agent, or Firm*—J. Harold Nissen

[57] ABSTRACT

A coupling device for coupling together heavy cargo pipes or the like which includes releasable plunger locking means to prevent rotation of a cam element in a locked condition and permit rotation in an unlocked condition. A liquid exit is also provided to prevent liquid accumulation and freezing together of relatively movable locking parts.

10 Claims, 5 Drawing Figures

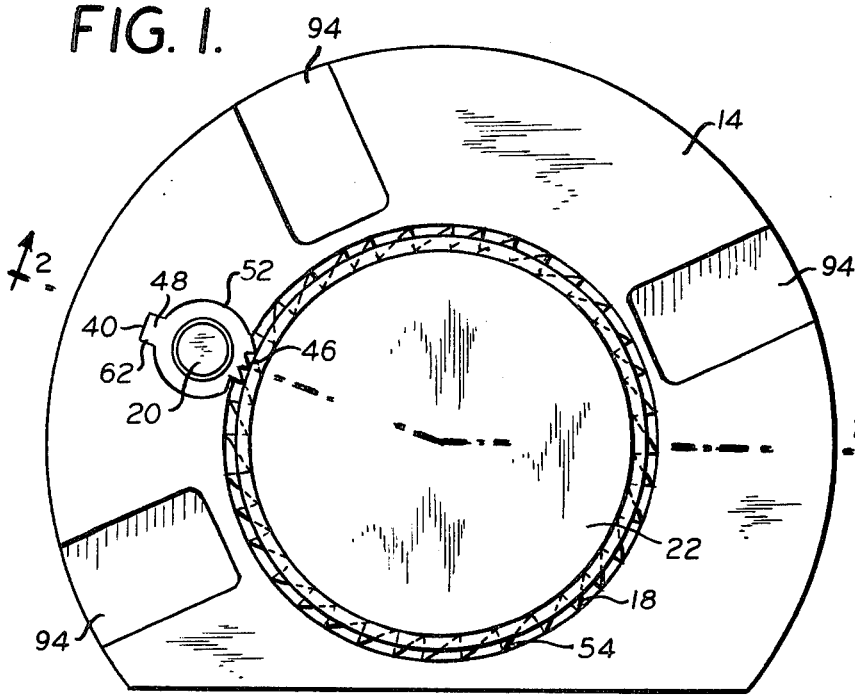
FIG. 1.
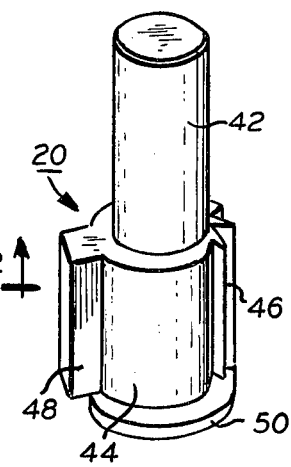
FIG. 5.
FIG. 4.
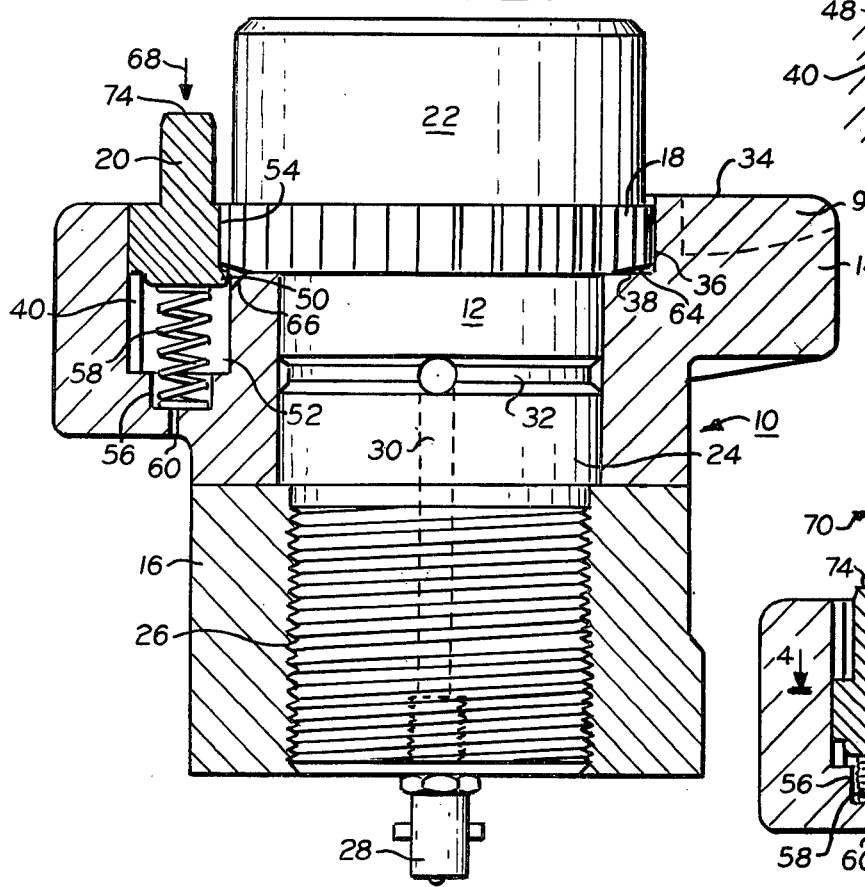
FIG. 2.
FIG. 3.

CAM LOCK WITH VERTICAL PLUNGER

BACKGROUND OF THE INVENTION

This invention relates to pipe couplings, and more particularly, to coupling devices which includes locking means for rapidly and efficiently coupling together and decoupling from each other hoses, pipes and tubes.

DESCRIPTION OF THE PRIOR ART

Pipe couplings have been known to the prior art for a considerable period of time. An adequate description of the prior art in this particular field is set forth in U.S. Pat. No. 2,996,318 over which this invention is an improvement. The desirability of coupling and decoupling two members such as pipes which have to be connected and disconnected speedily and without great effort is well-known. Moreover, it is necessary that a safe coupling be provided to insure positive connection and locking while affording ease of unlocking and disconnection.

Reference is also made to an earlier filed U.S. patent application Ser. No. 762,739, filed Jan. 26, 1977 in the name of William H. Gravert, and assigned to the Assignee of this invention which provides for a ring gear and slide locking member which cooperate with each other to provide for positive locking and unlocking.

In order to provide for an improved coupling, the aforesaid Gravert invention in Ser. No. 762,739 provides for a fail-safe coupling which includes positive locking engagement elements. A cooperating ratchet member or ring gear and slide locking element is provided. The ratchet member is fixed to a bolt and held in a clamp support. The cooperating slide locking element has teeth adapted to engage the teeth of the ratchet. The teeth of the slide locking element when in engagement with the ratchet permit rotation of the cam in its locking direction to lock the surface of the cam with the surface of the flange, but prevents rotation of the cam in a direction opposite to its aforesaid locking direction. A spring is provided to bias the slide locking element into engagement with the ratchet.

A wrench is provided to overcome the spring bias of the spring and cause the teeth of the slide locking element to become disengaged from the ratchet to permit the rotation of the cam in the opposite direction. The wrench is provided with a lug and the cam is provided with one or more lug receiving recesses to permit the wrench to engage the cam positively in a number of different positions and rotate the cam in either the locking or the unlocking direction. When the lug on the wrench is engaged with one of the recesses in the cam, the teeth of the slide locking element are disengaged from the teeth on the ratchet.

The cooperation between the slide locking element and the ratchet assures a positive locking effect therebetween. These two devices also assure locking of the cam surface with the flange surface with which the cam surface is engaged in their locking mode. Positive locking and unlocking is required.

The slide locking element is movable towards and away from the circumference of the ratchet member in a direction transverse to the axis thereof for engagement and disengagement of their respective teeth.

Moisture or some other liquid often times becomes lodged in the moving parts and freezes or locks the slide element and ratchet together so that it is difficult to move the cam and ratchet relative to each other. Movement of the slide element with the wrench may also create some problems due to the transference of motion from a first direction to a second direction transverse thereto along an inclined plane.

SUMMARY OF THE INVENTION

In order to provide for an improved locking and unlocking mechanism, and prevent freezing of the locking elements together, a substantially liquid free releasable locking means is provided comprising pathways including weep-holes are provided to permit liquid run-off. For this purpose, the cam is provided with a weep-hole to permit liquid run-off, and the teeth of the ring gear are chamfered or under-cut to permit egress of the liquid in a direction towards the weep-hole. Releasable locking means are provided which includes a plunger which cooperates with the ring gear in such a manner to provide for a positive breaking or opening action between the teeth of the plunger locking element and the ring gear, when it is necessary to uncouple the two elements to permit rotation of the cam in its unlocking or locking direction.

The plunger is in the form of a spring loaded plunger which is movable in a direction parallel to the axial direction of the ring gear to disengage their teeth and permit rotation of the cam in its locking or unlocking direction. In addition, the wrench acts along a direction parallel to the axis of the ratchet so that the motion of the wrench is transferred directly to the plunger to provide a direct decoupling action between the ring gear teeth and plunger teeth.

The plunger and ring gear in their locked together condition prevent rotation of the cam either clockwise or counterclockwise. The plunger is always spring-urged into its locked condition, and a wrench or other suitable cam device must be used to unlock them. Should icing take place or the freezing together of the plunger and ratchet, a hammer can be used to break the bond. Depending upon the materials carried, the plunger can be heated and liquid which is formed will run out of the weep-hole.

When flexible connection pipes are used, vibrations are normally set up and the positive locking action of the plunger and ratchet prevents undesired loosening and opening.

If desired, means can be provided to prevent unauthorized use of a wrench to move the plunger and thereby prevent the cam from being rotated in its unlocking or locking direction.

While the invention has as its primary purpose the coupling of two pipes together, it will be evident that the coupling in accordance with the invention may also be used to connect a cover plate to close off the entry to a pipe.

It is therefore, an object of this invention to provide a direct-acting coupling locking device with positive connection and positive disconnection.

Another object of the invention is to provide a spring-loaded plunger locking device to assure positive connections and locking of the cam surface to the surface of the flange.

A further object of the invention is to provide a spring-loaded plunger which is adapted to cooperate with a wrench to control movement of the ring gear and the cam both in a locking and an unlocking direction, to permit the movement of the cam to separate the contacting surfaces of the flange and the cam.

Other objects, advantages and the nature of the invention will be fully understood and become apparent from the following description of the preferred embodiment of the invention, shown, by way of example, in the accompanying drawing:

BRIEF DESCRIPTION OF THE DRAWINGS

FIG. 1 is a plan view of the pipe coupling in accordance with the invention;

FIG. 2 is a sectional view taken on line 2—2 of FIG. 1, of the pipe coupling with the plunger in its locking condition with the ring gear, FIG. 3 is a partial sectional view similar to FIG. 2. A portion of a wrench is shown in its fully engaged condition depressing the plunger to disengage the teeth of the plunger from the teeth of the ring gear;

FIG. 4 is a sectional view of the plunger taken on line 4—4 of FIG. 3; and,

FIG. 5 is a perspective view of the plunger.

DESCRIPTION OF THE PREFERRED EMBODIMENT

Referring to the drawings which illustrate a preferred embodiment of the invention, a quick-acting coupling 10 is shown which is an improvement over the coupling shown in U.S. Pat. No. 2,996,318. It is to be understood that the coupling of this invention is an improvement over the means to lock bolt 25, for example, to the clamp support 19 shown in the aforesaid patent, and the disclosure thereof is herein incorporated by reference. It is also to be understood that the coupling of invention is a modification of the coupling of application Ser. No. 762,739, the disclosure of which is incorporated where necessary.

Quick-acting coupling 10 in accordance with the present invention includes a bolt 12 which cooperates with a cam 14 having a sloped cam locking surface which corresponds with sloped cam surface 33 of the earlier U.S. Patent and a clamp support 16. Cam 14 and clamp support 16 are generally equivalent to cam 31 and clamp support 21 of the aforementioned U.S. Patent and include the associated elements such as the top surface of the flange 41 which have been omitted for the sake of clarity as they form no part of the present invention.

The improved locking features of the invention include a ring gear 18 which cooperates with a plunger locking element 20.

Bolt 12 includes a head portion 22 and a shank portion 24 which is threaded at its lower end 26 to threadedly engage clamp support 16. A suitable grease fitting 28 is attached to the lower end of bolt 12 which has a central bore 30 and a lateral bore 32 to provide sutiable lubrication at the surfaces between shank portion 24 and cam 14. Positioned on shank portion 24 below head 22 is ring gear 18 which is peripherally disposed on shank portion 24 and fixed to head 22, such as by welding so as to form a composite unit with bolt 12.

Cam 14 includes a top portion 34 which is peripherally recessed at 36 to form an L-shaped recess. Peripheral ring gear 18 is adapted to sit onto the base 38.

The improved locking features of the invention include a guideway 40 in cam 14 opening in a direction parallel to the axis of the ring gear 18 to guide plunger locking element 20 into the locking engagement with ratchet 18.

Referring more particularly to FIGS. 2, 4 and 5 of the drawing, plunger 20 includes a head 42 and a body portion 44. Body portion 44 includes a plurality of axially extending teeth 46 which are formed on one side of the outer periphery of the body portion. Body portion 44 also includes a longitudinally extending guide member 48 adapted to be received within guideway 48. Plunger 20, at its base portion beneath teeth 46 and body portion 44, is provided with an enlarged collar member 50 adapted to engage the base of ring gear 18.

Referring now to FIGS. 2, 3 and 4, cam 14 includes a cylindrical opening or plunger pathway 52 to receive plunger 20 extending from the top surface into the interior of cam 14. Opening 52 which forms a plunger pocket is joined with guideway 40. While guideway 40 and guide member 48 are shown diametrically opposite to teeth 46, it is understood that guideway 40 and guide member 48 do not have to be diametrically opposite to teeth 46; all that is necessary is that they be aligned with each other to insure engagement between teeth 46 and teeth 54 of ring gear 18.

Cam 14 includes a recessed U-shaped portion or spring alignment pocket 56 which is adapted to receive one end of a compression spring 58. The other end of spring 58 bears against collar 50 at the base of plunger 20. A weep-hole or passage 60 connecting the base of U-shaped portion 56 externally of the bottom of cam 14 is provided, as will be explained hereinafter. Plunger 20 and spring 58 may be held in place after assembly by means of collar 50 bearing against the underside of teeth 54. If it is desired to have plunger 20 and spring 58 held in place after disassembly and removal of bolt 12 and ring gear 18, the top portion 62 of guideway 40 may be peened over to prevent guide member 48 from being moved out of guideway 40, or any other suitable means can be used such as a coverplate to prevent plunger 20 from becomming dislodged from cam 14.

The base or lower portion of ring gear 18 is undercut or chamfered as at 64 and a chamfer 66 is provided on the base 38 and at one side of opening 52 to cooperate with chamfer 64 to provide for a free space between base 38 and teeth 54, as well as between teeth 54 and collar member 50 to permit liquid to run-off into opening 52. Any liquid which enters opening 2 is free to run into U-shaped recess 56 and out therefrom through weep-hole or passage 60. By permitting the liquid to run-off and out of cam 14, it is possible to eliminate the freezing of teeth 46 with teeth 54 and the formation of a frozen solid member which would surround spring 58 in opening 52 and act to prevent movement of plunger 20 to overcome the bias of spring 58.

Teeth 46 and 54 are shaped complementary to each other so as to prevent relative rotation between cam 14 and bolt 12 when the teeth are engaged. In order to permit relative rotation between bolt 12 and cam 14, the teeth 46 and 54 must be positively disengaged. When plunger 20 is in the position shown in FIG. 2, the teeth 46 and 54 are engaged. In order to move plunger vertically in a direction shown by arrow 68, a camming element or wrench 70 partially shown in FIG. 3 can be used to move plunger 20 in a direction parallel to the axis of ratchet 18, and thereby disengage teeth 46 and 54 from each other. Wrench 70 may be of the type designated 66 in application Ser. No. 762,739 filed Jan. 26, 1977, in the name of William H. Gravert. Wrench 70 as in application Ser. No. 762,739 would be provided with a circumferential portion 86 provided with an opening 88 which fits about bolt head portion 22 and includes a handle portion 90 (not shown) and a lug member 92 (not shown) which is adapted to fit within and engage the recessed or undercut portions 94.

The circumferential portion 86 includes a base bearing portion 72 which is adapted to engage top 74 of plunger 20 and move it to overcome the force of spring 58 to disengage teeth 46 and 54. Disengagement of teeth 46 and 54 permits cam 14 to be rotated in either a locking or an unlocking direction.

While opening 52 is shown as circular, it may be any shape provided teeth 46 and 54 are maintained in alignment with each other by the cooperation of guideway 40 and guide member 48. Also, teeth 46 and 54 are to be maintained in engagement with each other with collar member 50 being adapted to engage the chamfered underside of teeth 54. Guideway 40 and guide member 48 maintain plunger 20 axially aligned with the axis of bolt 12 after disengagement of the teeth 46 and 54.

By maintaining the teeth 46 and 54 axially aligned, the plunger 20 and ratchet 18 will lock together to prevent rotation of the cam 14 in either a clockwise or a counterclockwise direction and thereby assure positive locking in both directions. Loosening up under torsion or twisting is avoided so that positive locking is maintained.

While there has been shown what is considered to be a preferred embodiment of the invention, it will be obvious to those skilled in the art that various changes and modifications may be made therein without departing from the scope of the invention.

What is claimed is:

1. A coupling device for coupling together a pair of heavy pipes or hoses, comprising:
   a clamp support;
   a bolt threadedly received within and coupled to said clamp support, said bolt including a shank portion;
   a rotable cam element retatable about said bolt and held to said clamp support as a unit; and,
   moisture free releasable spring urged locking means to lock said cam element to said bolt to prevent rotation in any direction and for permitting the egress of liquid;
   said releasable locking means including a ring gear fixed to said bolt and peripherally disposed on said shank portion, and
   a spring urged plunger element carried by said cam element and movable in a direction parallel to the axis of said bolt,
   said ring gear and said plunger having teeth axially aligned with the axis of said bolt and complementary to each other and adapted for engagement with each other.

2. The coupling according to claim 1, including cooperative means on said cam element and said plunger to maintain said plunger teeth and said ring gear teeth in engagement.

3. The coupling according to claim 2, wherein said cooperative means includes:
   said cam including a plunger compartment, said plunger compartment including a plunger pathway and a U-shaped recess at the bottom of said pathway;
   a guideway connected with said pathway;
   said spring urged plunger including a body portion movable within said plunger pathway, said body portion having a base portion, a guide member connected with said body portion and held within said guideway to guide the movement of said plunger, and a compression spring positioned within said plunger compartment, said compression spring having one end received in said U-shaped recess and the other end bearing against said base portion urging said plunger away from said U-shaped portion; and
   said base portion including a collar member having a peripheral extent to engage the underside of said teeth of said ring gear when said plunger teeth and said ring gear teeth are in engagement.

4. The coupling according to claim 3, including:
   means cooperating with said guideway to hold said plunger body portion in said plunger compartment.

5. The coupling according to claim 4, wherein said releasable spring urged locking means includes:
   means to prevent liquid accumulation, said means comprising:
   weep passage means connecting said U-shaped recess externally of said cam; and
   said ratchet teeth being chamfered, and said plunger compartment having an upper edge portion chamfered to provide with said chamfered teeth a passageway for liquid to flow into said plunger compartment and externally thereof through said weep passage means.

6. The coupling according to claim 5, including a wrench engageable with said plunger, said wrench moving said plunger against the force of said compression spring to disengage said plunger teeth from said ratchet teeth.

7. A coupling device as set forth in claim 1, wherein said ring gear teeth are circumferentially spaced coaxially with the axis of said bolt;
   said spring urged plunger includes a head, a body portion having said teeth complementary to said ring gear teeth, a collar member below said body portion, and extending beyond said plunger teeth, a spring operatively associated with said plunger, and a guide member connected with said body;
   and wherein said cam element includes:
   a plunger pocket, a guideway connecting the top surface of said cam element with said plunger pocket, a recessed portion having a base, said base having an edge portion connected with said plunger pocket, said ring gear resting on said base and fitting within said recessed portion, said ring gear teeth extending into said plunger pocket;
   a spring pocket beneath said plunger pocket and connected therewith, said spring having one end received within and guided by said spring pocket, the other end of said spring bearing against the base of said plunger collar to hold said collar in engagement with said ring gear teeth extending into said plunger pocket; and,
   a passageway extending through said cam element communicating with said plunger pocket.

8. A coupling device as set forth in claim 7, wherein:
   said ring gear teeth include a chamfered portion at the bottom thereof,
   the edge of said base connected with said plunger pocket being chamfered, said chamfered edge and said chamfered teeth forming a passage therebetween connected with said plunger pocket and said passageway.

9. A coupling device as set forth in claim 8, wherein:
   said passageway extends from the outside of said cam element into said spring pocket, and
   said passage communicates with said passageway through said plunger pocket and said spring pocket so that liquid caught between said teeth can pass out of said pockets through said passageway.

10. A coupling device as set forth in claim 7, wherein:

said head extends externally of the top surface of said cam element, said plunger being movable in an axial direction parallel to the axis of said ratchet, said bolt having a head portion extending above said cam element, means engageable with said head portion to bear against said head to move it into said plunger pocket and flush with the top surface of said cam element to disengage said plunger teeth from said ring gear teeth, said engageable means being effective to overcome the force of said spring to compress said spring into said spring pocket, and said engageable means including means connectable with said cam element for rotation thereof about the axis of said bolt.

* * * * *